United States Patent [19]
Kappel et al.

[11] Patent Number: 6,050,425
[45] Date of Patent: Apr. 18, 2000

[54] STORAGE RACK FOR RECORDING MEDIA

[75] Inventors: Herman Kappel, Lawrence; Gregory Carbonaro, East Islip, both of N.Y.

[73] Assignee: Kantek, Inc., East Rockaway, N.Y.

[21] Appl. No.: 09/110,313

[22] Filed: Jul. 6, 1998

[51] Int. Cl.[7] .................................................. A47G 19/08
[52] U.S. Cl. ...................... 211/40; 211/41.12; 211/88.01; D6/407
[58] Field of Search ................... 211/40, 41.12, 211/88.01, 71.01, 134, 130.1, 133.3, 126.13; D19/78; 206/557; 248/152; D6/407

[56] References Cited

U.S. PATENT DOCUMENTS

| | | | |
|---|---|---|---|
| D. 55,077 | 5/1920 | Page | 211/71.01 |
| D. 405,831 | 2/1999 | Jarjoura | D19/78 |
| 968,253 | 8/1910 | Moses | 312/9.53 |
| 1,303,299 | 5/1919 | Hahl | 206/309 |
| 2,105,594 | 1/1938 | Henrich | 211/88.01 X |
| 2,135,093 | 11/1938 | Abrams | 248/152 |
| 2,430,166 | 11/1947 | Fish et al. | 211/130.1 X |
| 3,208,583 | 9/1965 | Kamps | 206/557 X |
| 3,438,508 | 4/1969 | Kuns et al. | 211/133.3 |
| 3,511,386 | 5/1970 | Greenberger | 211/88.01 |
| 4,164,287 | 8/1979 | Muller et al. | 211/134 |
| 4,676,372 | 6/1987 | Rager | 211/40 X |
| 4,684,019 | 8/1987 | Egly | 206/309 |
| 4,776,463 | 10/1988 | Press | 106/444 |
| 5,083,663 | 1/1992 | Conway et al. | 211/88.01 X |
| 5,141,115 | 8/1992 | Nicoll | 211/88.01 X |
| 5,170,893 | 12/1992 | Smith | 211/40 |
| 5,297,675 | 3/1994 | Martucci | 211/40 X |
| 5,333,741 | 8/1994 | Yang | 211/40 |
| 5,341,943 | 8/1994 | Fraser | 211/40 |
| 5,358,124 | 10/1994 | Mueller | 211/41 |
| 5,393,135 | 2/1995 | Tisbo et al. | 312/9.48 |
| 5,577,620 | 11/1996 | Jacob | 211/40 |
| 5,595,308 | 1/1997 | King et al. | 211/40 |
| 5,611,426 | 3/1997 | Warfield | 206/308.1 |

FOREIGN PATENT DOCUMENTS

WO 86/06599  11/1986  WIPO .................................. 211/41.12

*Primary Examiner*—Daniel P. Stodola
*Assistant Examiner*—Khoa Tran
*Attorney, Agent, or Firm*—Schweitzer Cornman Gross & Bondell LLP

[57] ABSTRACT

A storage rack, preferably for storage of computer diskettes and CD roms, includes a base, rear panel, and a pair of arms upon which the items to be stored are arrayed in a tiered, upright orientation. The arms are provided with a series of slots, the side walls of which support items of a first width. The slots have an intermediate wall which divides the slot into two smaller-width slots. The walls of the smaller-width slots support items of a second width. The storage rack may be fabricated from a unitary sheet of material. The rear panel, base and arms are joined as required by integral hinge areas, which allow the rack to be assembled from a flat configuration without separating the individual elements. In the flat, unassembled state the rack is especially well adapted for shipping, and can be bound into periodicals and the like for promotional purposes.

8 Claims, 4 Drawing Sheets

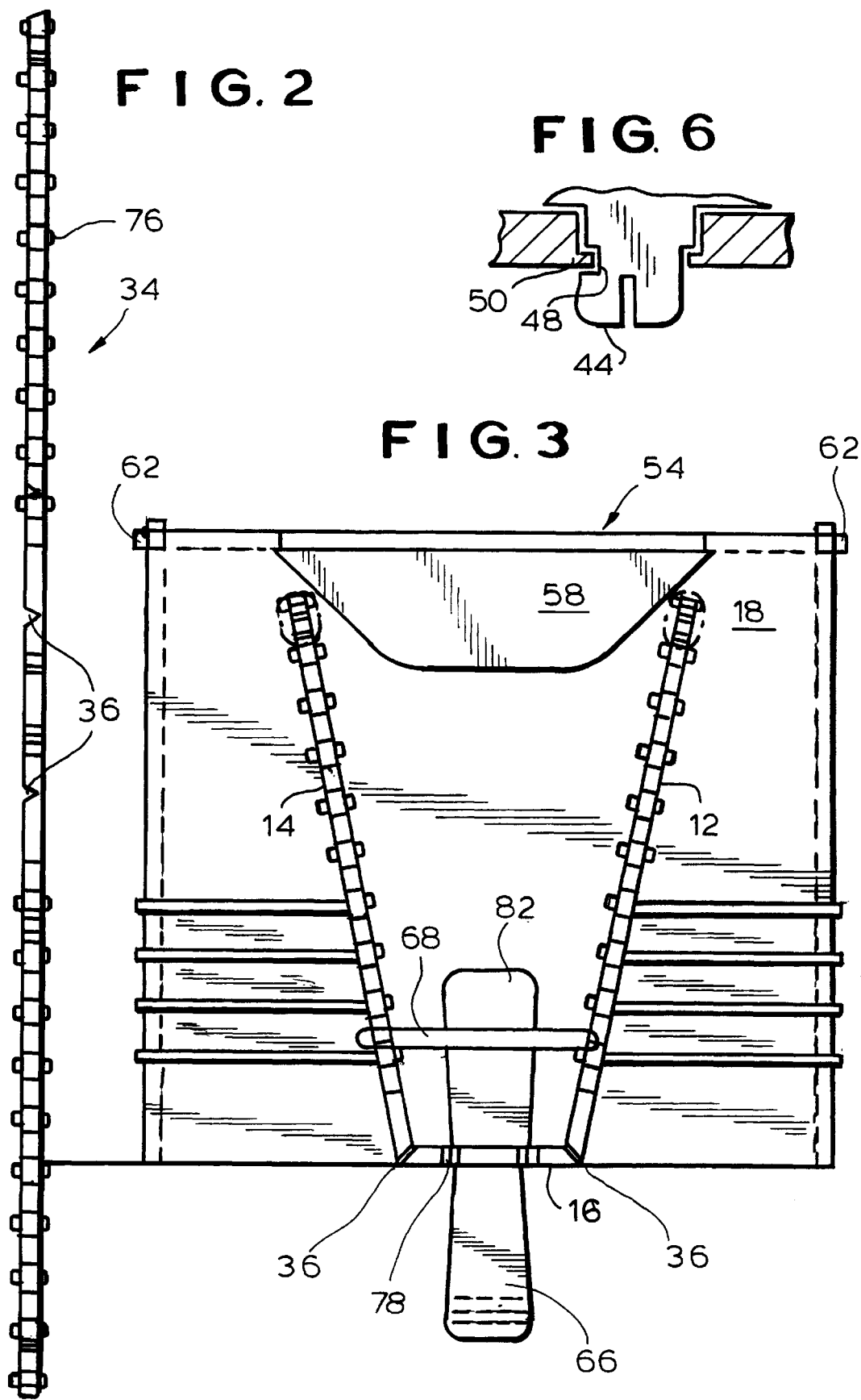

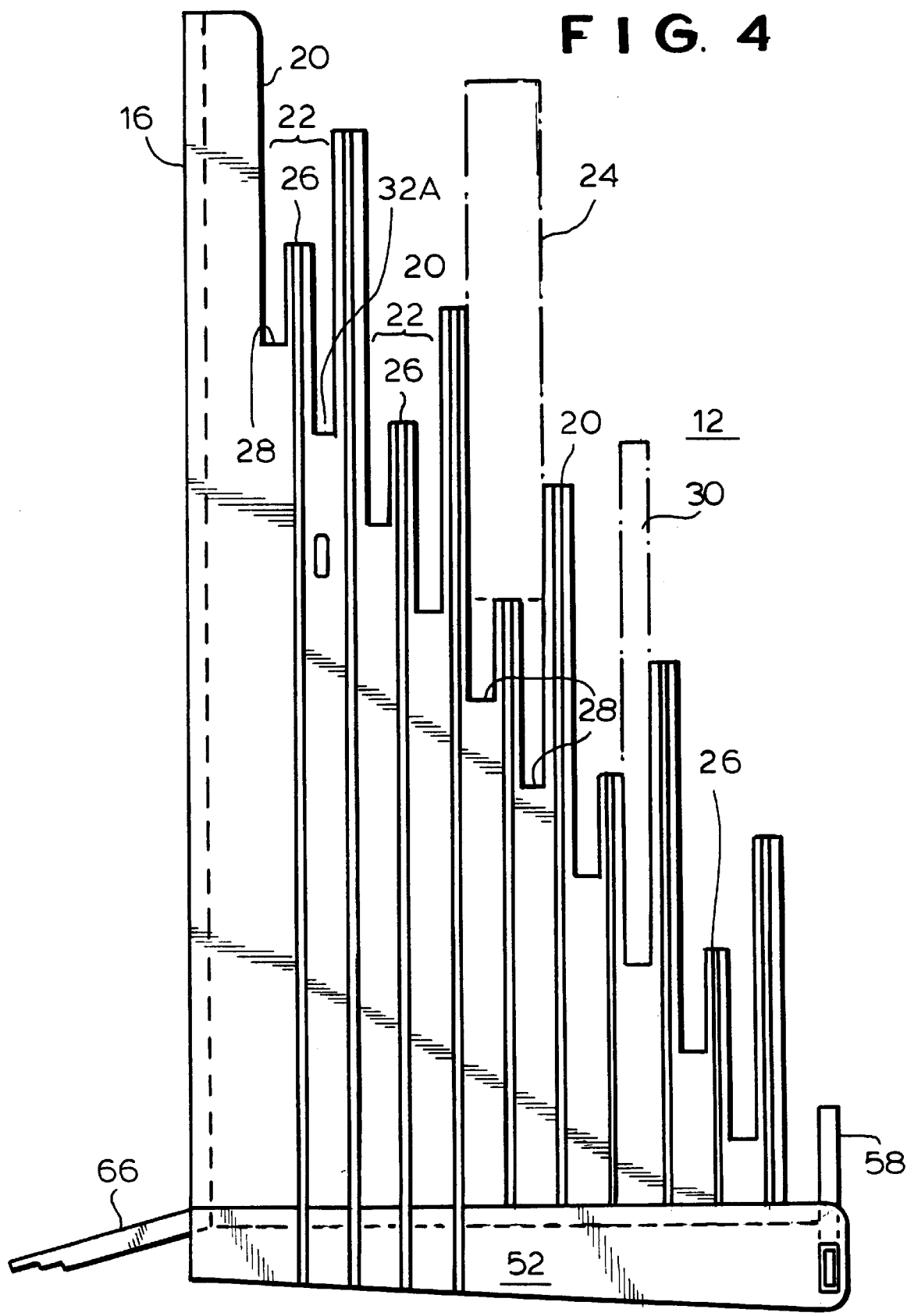

STORAGE RACK FOR RECORDING MEDIA

The present invention relates to a new and improved storage rack for computer discs, CD roms, and similar storage media.

BACKGROUND OF THE INVENTION

With the proliferation of personal computer systems and the utilization of a wide variety of storage media, such as floppy discs, CD roms and other affordable media, the computer user often develops a substantial collection of such media. It is accordingly a purpose of the present invention to provide a new and improved storage rack capable of storing in a convenient manner a plurality of storage media units.

It is further a purpose of the present invention to provide a storage rack which may be manufactured from a single unitary blank of a sheet-like material, and which may be transported flat, for construction into the operative rack by the intended user.

Yet a further purpose of the present invention is to provide a rack of the aforementioned type which allows storage of the media thereon in a manner which facilitates inspection and observation of the individual media items stored thereon.

BRIEF DESCRIPTION OF THE INVENTION

In accordance with the foregoing and other objects and purposes, the storage device of the present invention comprises a rack for storing a plurality of storage media units in which the individual storage media units are arrayed in an upright configuration upon an ascending tier of opposed slot areas located in a pair of spaced arms. A first set of slot areas on each arm is formed by a series of wall portions or dividers extending upwardly on the arms, the distance between a pair of wall portions defining a first slot accepting a storage media unit of a first thickness, such as a CD rom jewel case. A series of second wall portions extend upwardly between pairs of first wall portions, dividing the first slots into pairs of second slots between a second wall as the oppositely adjacent first walls. These second slots accept storage media units of a second, lesser thickness than that of the first storage media units, such as 3.5 inch diskettes or "naked" CD roms. The two arms extend forwardly from a rear panel, which may include means to allow the storage unit to be mounted to a wall or similar vertical panel. A base supports and interlocks with the arms to maintain them in position. The provision of slots of two sizes allows the various storage media, as well as other objects of differing widths, to be intermixed and stored together on a single storage unit.

Preferably, the rear panel, arms and base may be formed from a single panel of a rigid yet flexible material, such as plastic, the individual portions of the rack being joined together as appropriate by integral hinges which allow the portions to be folded from the initial flat configuration into an assembled orientation. Integral locking tabs and mating slots maintain the portions in the assembled orientation. Because the rack may be manufactured from a single flat sheet, the rack is particularly advantageous for use as a promotional item, as it may be shipped flat and otherwise bound into magazines and periodicals for distribution.

BRIEF DESCRIPTION OF THE DRAWINGS

A fuller understanding of the present invention will be accomplished upon consideration of the following detailed description of a preferred, but nonetheless illustrative embodiment thereof, when reviewed in connection with the annexed drawings wherein:

FIG. 2 is a end view of the sheet of FIG. 1;

FIG. 3 is a top plan view of the rack invention in the assembled configuration;

FIG. 4 is a side elevation view of the invention in the assembled configuration;

FIG. 6 is an enlarged elevation view of a representative connection between an arm and the base of the invention.

DETAILED DESCRIPTION OF THE INVENTION

Figure 5:
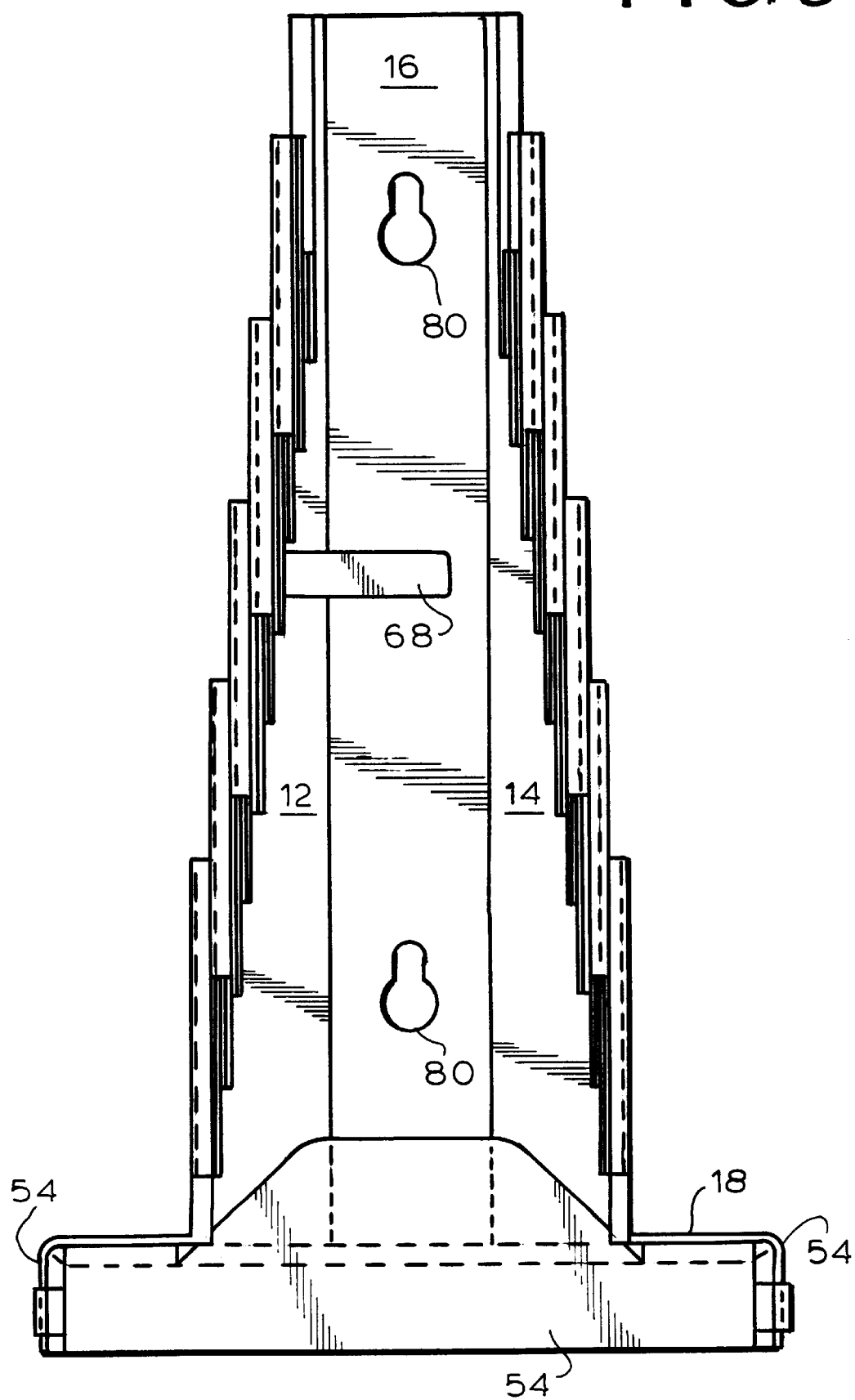
FIG. 5 is a front elevation view of the invention in the assembled configuration.

With reference to the Figures, and particularly FIGS. 3–5, the storage rack 10 of the present invention includes a pair of spaced arms 12, 14 extending forward from a rear panel 16 and upwardly from a base 18. Each of the arms 12, 14 has a series of upstanding major dividers or walls 20 forming therebetween a series of shelf areas or slots 22 each capable of receiving a so-called "jewel case" CD rom holder 24 in an upright orientation. The walls 20 are arranged in a tiered order, extending upwardly from the front of the rack to the rear panel 16.

As seen particularly in FIG. 4, each shelf space or slot 22 is further subdivided by an intermediate divider wall 26 into a pair of further staggered second shelf areas or slots 28, each capable of supporting a second storage item, such as floppy disc 30, between an intermediate divider wall 26 and an adjacent wall 20. The heights of the walls 20 are greater than that of the intermediate walls 26, such that the CD rom unit 24 supported by a pair of adjacent walls 20 on an arm rests upon the top edge of the intermediate divider wall 26. The floppy disc 30 is supported upon a horizontal surface 32 defining the bottom wall of a shelf area or space 28 and is supported at its front and rear faces by a major divider 20 and an intermediate divider 26. In a particularly preferred embodiment, the bottoms of the spaces 28 may be inclined as shown by phantom line 32' in FIG. 4 to provide a slight backwards tilt to the inserted media. Both CD rom storage cases 24 and floppy discs 30 may be intermingled on the shelf apparatus as desired, the major dividers 20, intermediate dividers 26, and shelf area bottoms 32 being in the tiered orientation whereby the stacked storage units form a similar tiered and stacked relationship to allow visibility of each of the units and to facilitate insertion and removal.

Figure 1:
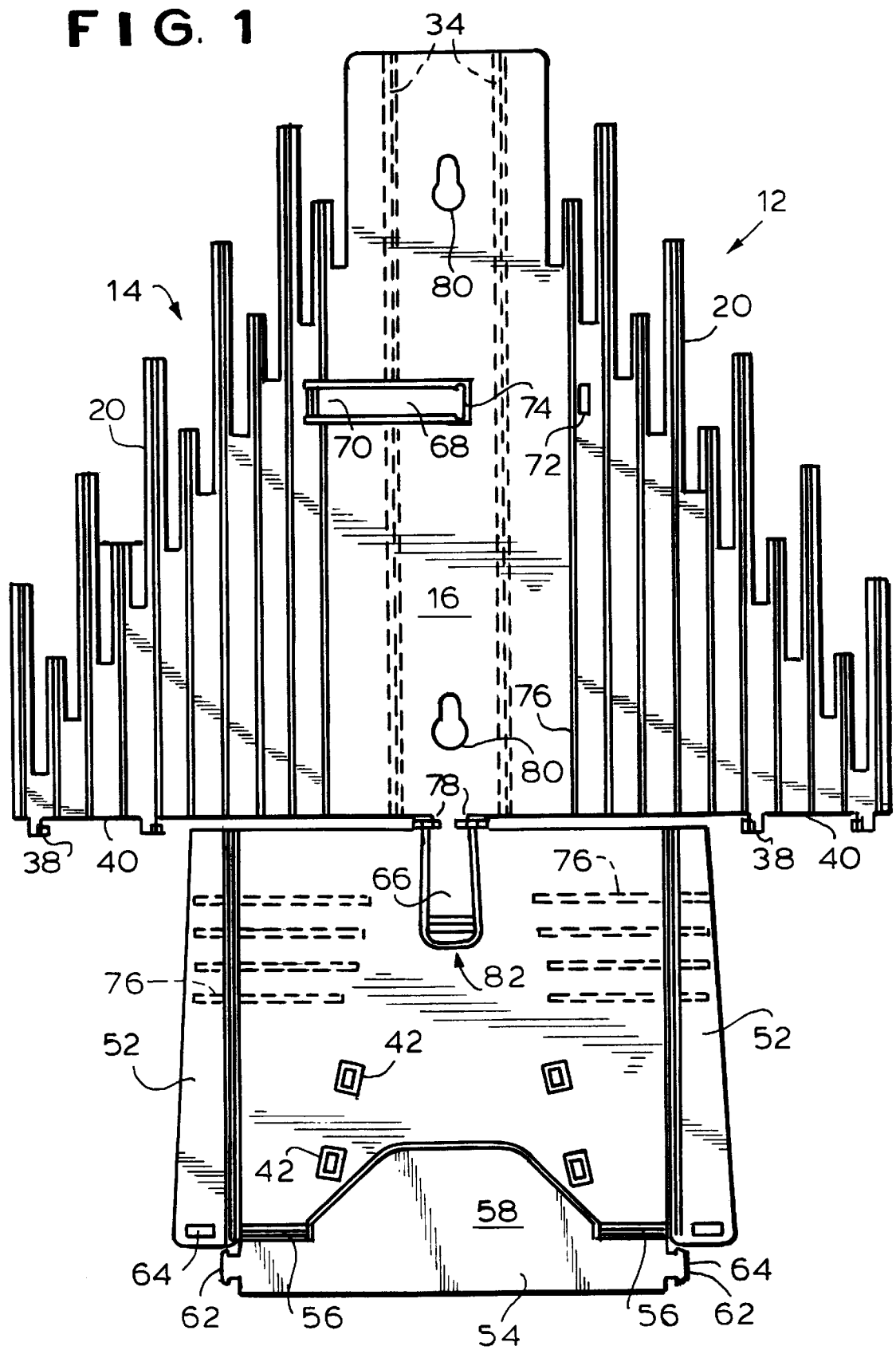
FIG. 1 is a plan view of a die cut sheet formed into the structure of the present invention, with rear panel, arms and base integrally formed therein.

With reference to FIG. 1, the arms 12 and 14, rear panel 16 and base 18 of the storage rack may be advantageously formed from a single blank 34 of an appropriate construction material, such as thin gauge plastic, preferably die cut or punched as required. The arms 12, 14 are joined to rear panel 16 through a pair of parallel integral hinges 36, which may be in the form of notches in the blank, as seen in FIG. 2. The integral hinges 34 permit the arms to be folded into the splayed outward configuration shown in FIG. 3 from the initial flat configuration shown in FIG. 1. Similarly, base 18 is formed integrally with rear panel 16 and arms 12, 14 and is joined to the rear panel 16 through integral hinges 78. Once again, the hinges 78 allow the base 18 to be folded to a position generally perpendicular to the rear panel 16 as depicted in FIG. 4.

In order to retain the constructed rack in the folded, operative configuration, means are provided to interlock the various portions together. As seen generally in FIG. 1, the arms 12 and 14 are provided with L-shaped flanges 38 on their lower edges 40 which fit into accommodating stepped apertures 42 in base 18. As detailed in FIG. 6, each of the flanges 38 include a generally bulbous head 44 with a notch 46 permitting the head of the flange to flex slightly. A neck portion 48 of the flange engages the lower step portion 50 of the aperture 42, removably securing the flange in the aperture and thus retaining the arm in the desired position.

The rack 10 is supported on a flat surface by depending side legs 52 and front leg panel 54 of base 18. The front leg panel 54 is joined to the base through integral hinge portions 56. When the front leg panel is pivoted to the perpendicular position, as shown in FIGS. 4 and 5, leg panel portion 58 extends upwardly from base panel 18 as seen in FIG. 4, forming a frontmost intermediate divider wall. The front surface of portion 58 serve as an imprint area for indicia, for example, when the rack is used as a promotional piece. The side legs 52 are joined to base panel 18 by integral hinges 60, which similarly allow the side leg portions to pivot downwardly to the perpendicular position shown in FIGS. 4 and 5. Flanges 62 on the side edges of the front leg panel 54 engage complementary slots 64 at the front edges of the side legs 52 to lock and maintain the legs in the pivoted positions. As shown, the side legs 52 are slightly tapered to provide a rearward cant to the rack to improve stability. The base 18 includes a U-shaped central cutout portion 82, the interior of which creates a stabilizing leg 66 similarly pivotally joined to the rear panel 16 by a portion of the integral hinges 78. As seen in FIGS. 3 and 4, the stabilizing leg 66 may be bent rearwardly and downwardly from the rear panel to provide additional stability for the rack and to prevent the rack from rocking backwards.

To further assist in supporting and retaining the arms 12, 14 in the folded, assembled position, and to counteract potential restoring forces along the hinge lines 34, arm 14 is provided with locking arm 68 pivotally joined to the arm 14 by integral hinge portion 70. The locking arm 68 is die cut from the material forming arm 14 and the adjoining portion of rear panel 16, as best seen in FIG. 1. The arm 12 is provided with a correspondingly located notch 72 into which the locking end 74 of the locking arm extends when the arms are in the assembled position, as seen in FIG. 5.

The rack may be formed from an appropriate plastic, such as a polyarylate, or polycarbonate compounded to have the necessary flexibility for the integral hinges. The thickness of the material is typically in the order of 0.1 inch. As shown, the various portions of the assembly may be provided with integrally cast ribs or spines 76 to provide increased rigidity without substantially increasing the overall thickness or weight of the assembly. As shown in FIG. 2, the ribs may appear on both sides of the blank.

Shipped or otherwise distributed in a flat configuration, the rack can be easily and quickly assembled without tools. The base 18 is pivoted along hinges 78 into a approximately perpendicular orientation with respect to the rear panel 16, and the arms 12, 14 are similarly pivoted to a splayed orientation, the locking flanges 38 being inserted into the corresponding apertures 42 in the base. The locking arm 68 on arm 14 may be then aligned with and inserted into corresponding locking notch 72 on the opposed arm 12. The front leg 54 may then be pivoted to the depending position, with the portion 58 extending upright at the front of the base to form the frontmost intermediate divider 28 and the side legs folded down, such that their locking notches 64 engage the flanges 62 on the front leg. Stabilizer 66 may then be pivoted as necessary outwardly and downwardly as shown in FIG. 4. Alternatively, the rack may be mounted by rear mounting slots on a vertical surface, the stabilizer 66 then being oriented to rest against the vertical surface in the same plane as rear panel 16.

In the assembled state, both CD rom cases 24 and floppy discs 30 are supported in upright orientations by the arms, either between the main divider portions 20 or between a main divider portion and an intermediate divider portion 26.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

We claim:

1. A storage rack comprising a vertical rear panel, a base connected to a bottom edge of the rear panel and extending horizontally forward therefrom, and a pair of spaced arms, each of said arms having a tiered array of vertical slots at an upper edge to the arm having opposed front and rear vertical walls spaced to form supports for stored items of a first thickness placed upon and supported by said arms, said slots having an intermediate wall of a lesser height than a height of the front and rear walls between which it is located between the front and rear walls dividing the slot into first and second secondary slots, each bounded by one of the front and rear walls and the intermediate wall, said intermediate wall having a top edge serving as a bottom support for a stored item of a first thickness; the walls of a secondary slot forming support for a stored item of a second thickness.

2. The storage rack of claim 1 wherein said rear wall, base and arms are formed from a unitary piece of sheet material, said arms and base being connected to said rear wall by integral hinges allowing folding of said arms and base from a flat configuration to an assembled configuration.

3. The storage rack of claim 2 wherein said base and arms are each provided with interlock means to maintain the storage rack in the assembled configuration.

4. The storage rack of claim 3 wherein said arms are splayed outwardly from said rear wall.

5. The storage rack of claim 4 wherein said base includes a pair of depending side legs and a depending front legs, said legs being formed from said unitary piece of sheet material and being connected to said base by integral hinges allowing folding of said legs from the flat configuration to the assembled configuration.

6. The storage rack of claim 5, wherein said base side legs are tapered to provide a rearward tilt to said rack when in the assembled configuration.

7. The storage rack of claim 1 wherein said intermediate walls have a top edge upon which a storage media unit of a first thickness placed in a slot rests.

8. The storage rack of claim 1, wherein said first and second slots each have an inclined bottom wall.

* * * * *